United States Patent
Timinger (10) Patent No.: US 11,828,430 B2
(45) Date of Patent: Nov. 28, 2023

(54) SPREADING FEATURE FOR AUTOMOTIVE REAR FOG LIGHTING

(71) Applicant: LUMILEDS LLC, San Jose, CA (US)

(72) Inventor: Andreas Timinger, Aachen (DE)

(73) Assignee: LUMILEDS LLC, San Jose, CA (US)

(*) Notice: Subject to any disclaimer, the term of this patent is extended or adjusted under 35 U.S.C. 154(b) by 0 days.

(21) Appl. No.: 18/080,439

(22) Filed: Dec. 13, 2022

(65) Prior Publication Data
US 2023/0184402 A1    Jun. 15, 2023

Related U.S. Application Data (60) Provisional application No. 63/288,933, filed on Dec. 13, 2021.

(51) Int. Cl.
| | |
|---|---|
| *F21S 41/25* | (2018.01) |
| *F21S 41/141* | (2018.01) |
| *G02B 3/06* | (2006.01) |
| *B29D 11/00* | (2006.01) |
| *F21W 103/40* | (2018.01) |

(52) U.S. Cl.
CPC ........ *F21S 41/25* (2018.01); *B29D 11/00019* (2013.01); *F21S 41/141* (2018.01); *G02B 3/06* (2013.01); *F21W 2103/40* (2018.01)

(58) Field of Classification Search
CPC ........ B29D 11/00009; B29D 11/00019; B29D 11/00403; G02B 3/06; F21S 41/25; F21S 41/141; F21S 41/265; F21S 41/27; F21S 41/275; F21W 2103/40; F21V 5/04; F21V 5/043; F21V 5/045
See application file for complete search history.

(56) References Cited

U.S. PATENT DOCUMENTS

| | | | |
|---|---|---|---|
| 5,742,438 A | 4/1998 | Conner et al. | |
| 5,844,723 A | 12/1998 | Snyder | |
| 6,212,011 B1 | 4/2001 | Lissotschenko et al. | |
| 6,728,039 B2 | 4/2004 | Tanaka | |
| 2012/0033441 A1* | 2/2012 | Sousek | F21S 43/14 362/555 |
| 2019/0130642 A1* | 5/2019 | Elber | G06T 17/10 |

FOREIGN PATENT DOCUMENTS

| | | | | |
|---|---|---|---|---|
| DE | 19951407 A1 * | 5/2001 | .......... | F21S 48/1233 |
| EP | 1170548 A2 * | 1/2002 | .......... | F21S 48/2212 |
| WO | 2005/050264 | 6/2005 | | |

OTHER PUBLICATIONS

IDEX Optics and Photonics—Marketplace, "How to Select Cylindrical Lenses," (2021).

\* cited by examiner

*Primary Examiner* — Erin Kryukova
(74) *Attorney, Agent, or Firm* — Volpe Koenig (57) ABSTRACT

A light spreading lens, an automotive lighting system, and method of manufacturing a light spreading lens are described. The light spreading lens includes an outer surface. The outer surface is defined by a Boolean intersection of a first cylindrical lens overlaid with a second cylindrical lens. The first cylindrical lens is configured to distribute light along a first axis. The second cylindrical lens is configured to distribute light along a second axis.

9 Claims, 10 Drawing Sheets

```
┌─────────────────────────────────────────────────┐
│ In a computer program, position a first lens    │──── 2010
│ along a first axis with a first axis of the first│
│ cylindrical lens running parallel to the first axis.│
└─────────────────────────────────────────────────┘
                        │
                        ▼
┌─────────────────────────────────────────────────┐
│ In a computer program, position a second lens   │──── 2020
│ along a first axis with a second axis of the    │
│ second cylindrical lens running parallel to the │
│                  second axis.                   │
└─────────────────────────────────────────────────┘
                        │
                        ▼
┌─────────────────────────────────────────────────┐
│ In a computer program, combine the first lens   │──── 2030
│ and the second lens to form a combined lens.    │
└─────────────────────────────────────────────────┘
                        │
                        ▼
┌─────────────────────────────────────────────────┐
│ In a computer program, perform a Boolean        │──── 2040
│    intersection of the combined lens.           │
└─────────────────────────────────────────────────┘
                        │
                        ▼
┌─────────────────────────────────────────────────┐
│ Cut a lens so that the outer surface of the lens│──── 2050
│  has a shape that is the result of the Boolean  │
│                  intersection.                  │
└─────────────────────────────────────────────────┘
```

SPREADING FEATURE FOR AUTOMOTIVE REAR FOG LIGHTING

CROSS REFERENCE TO RELATED APPLICATION(S)

This application claims the benefit of U.S. Application Ser. No. 63/288,933, filed Dec. 13, 2021, which is incorporated by reference as if fully set forth.

BACKGROUND

Rear fog lighting is regulated and required to have a high level of uniformity in the intensity distribution of light within a cross-shaped directional range. Thus, the optical design of the rear fog lighting must ensure a uniform distribution of light output within the cross-shaped directional range. Conventionally, for light-emitting diode (LED) fog lights, a transparent collimating element would be incorporated into the optics at a first surface, and spreading features would be incorporated into the optics at a second surface. In such fog lights, the spreading features would need to be designed to form the uniformly lit cross-shaped distribution of light intensity from the LED-emitted light collimated by the first surface.

SUMMARY

A light spreading lens, an automotive lighting system, and method of manufacturing a light spreading lens are described. The light spreading lens includes an outer surface. The outer surface is defined by a Boolean intersection of a first cylindrical lens overlaid with a second cylindrical lens. The first cylindrical lens is configured to distribute light along a first axis. The second cylindrical lens is configured to distribute light along a second axis.

BRIEF DESCRIPTION OF THE DRAWINGS

A more detailed understanding can be had from the following description, given by way of example in conjunction with the accompanying drawings wherein.

DETAILED DESCRIPTION

Examples of light spreading lenses, spreading structures, and optical systems for automotive rear fog lighting will be described more fully hereinafter with reference to the accompanying drawings. These examples are not mutually exclusive, and features found in one example may be combined with features found in one or more other examples to achieve additional implementations. Accordingly, it will be understood that the examples shown in the accompanying drawings are provided for illustrative purposes only and they are not intended to limit the disclosure in any way. Like numbers refer to like elements throughout.

It will be understood that, although the terms first, second, third, etc. may be used herein to describe various elements, these elements should not be limited by these terms. These terms may be used to distinguish one element from another. For example, a first element may be termed a second element and a second element may be termed a first element without departing from the scope of the present disclosure. As used herein, the term "and/or" may include any and all combinations of one or more of the associated listed items.

It will be understood that when an element such as a layer, region, or substrate is referred to as being "on" or extending "onto" another element, it may be directly on or extend directly onto the other element or intervening elements may also be present. In contrast, when an element is referred to as being "directly on" or extending "directly onto" another element, there may be no intervening elements present. It will also be understood that when an element is referred to as being "connected" or "coupled" to another element, it may be directly connected or coupled to the other element and/or connected or coupled to the other element via one or more intervening elements. In contrast, when an element is referred to as being "directly connected" or "directly coupled" to another element, there are no intervening elements present between the element and the other element. It will be understood that these terms are intended to encompass different orientations of the element in addition to any orientation depicted in the figures.

Relative terms such as "below," "above," "upper,", "lower," "horizontal" or "vertical" may be used herein to describe a relationship of one element, layer, or region to another element, layer, or region as illustrated in the figures, unless explicitly stated otherwise. It will be understood that these terms are intended to encompass different orientations of the device in addition to the orientation depicted in the figures.

As mentioned above, regulations for automotive rear fog lighting require a high level of uniformity in the intensity distribution of light within a cross-shaped directional range. For example, regulations may require the luminous intensity of emitted light from the luminaire to be at the same levels within the cross-shaped directional range. For example, regulations may require the luminous horizontal line within 10 degrees left and 10 degrees right of the luminaire and the luminous vertical line to be within 5 degrees down and 5 degrees up of the luminaire to have the same levels of luminous intensity. Allowed variation and tolerances of the production of the rear fog lighting, including, for example, the manufacturing of the electrical drive components and light source, make regulations regarding the intensity distribution difficult to meet.

A combination of different elements may be incorporated into light spreading structures to form the desired cross-shaped intensity distribution. For example, light spreading structures may be comprised of a number of different elements in front of a single LED or a number of distinguishable discreet elements in front of a number of different LEDs with the discreet elements superimposed to create a common light distribution. The elements may include lenses in the shape of cylindrical prisms or flat-top pyramids as well as sections from lens surfaces. The superimposition of discreet elements may result in the multiple elements contributing to the center of the light distribution, which may create a more intense center. However, per regulations, the central point should not be brighter or more intense than the rest of the cross-shaped intensity distribution. Avoiding or correcting this effect may be especially challenging with the allowed tolerances during manufacturing or production. With tolerances, such as displacement between optics and LEDs in assembly, the often finely balanced approach of individual contributions by the elements to the overall distribution of the light may fail and produce significant intensity differences in what should be uniform distribution. Additionally, fabricating individual elements, such as prisms, may be complex.

Therefore, a light spreading lens comprising sections of two cylindrical lens surfaces combined to create a single surface that may uniformly distribute light from a luminaire into a desired distribution pattern, such as a cross-shaped or rhombus-shaped distribution, may be advantageous. A cylindrical surface is not limited to a geometric cylinder. Instead, a cylindrical surface may include any surface made by a linear extrusion of an arc-like profile. A light spreading structure comprised of identical light spreading lenses on a single surface may be advantageous.

Figure 1:
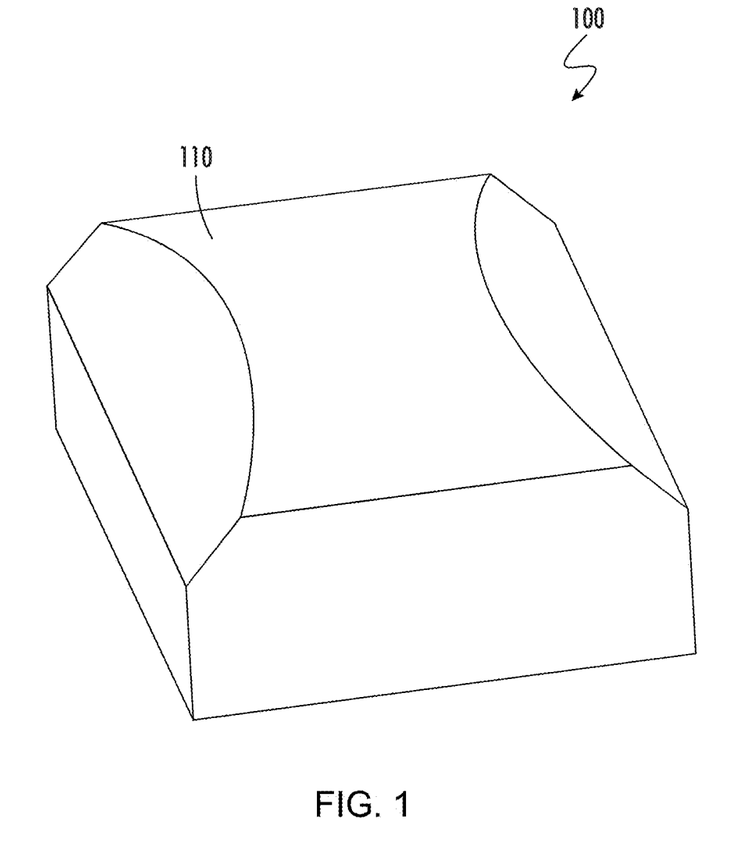
FIG. 1 is a perspective view of a light spreading lens.

FIG. 1 is a perspective view of an example light spreading lens 100. The illustrated light spreading lens 100 includes an outer surface 110. The shape of the outer surface 110 of the light spreading lens 100 may be the result of a Boolean intersection of at least two lenses. A Boolean intersection may be an operation that shapes an object by keeping only the portion that is common to two or more source objects. The Boolean intersection may be performed in a computer program. For example, the Boolean intersection may be performed with Computer Aided Design (CAD) software. The light spreading lens 100 may control the distribution of light passing through the light spreading lens 100. The light spreading lens 100 may be configured to distribute the light exiting the outer surface 110. The lens 100 may be comprised of transparent plastic, such as PMMA, Polycarbonate, or glass. The light spreading lens 100 may uniformly distribute light within a desired pattern. For example, the light spreading lens 100 may uniformly distribute light from a luminaire in a cross-shaped directional range. The light spreading lens 100 may eliminate the need to superimpose multiple elements to distribute the light in a desired pattern. The light spreading lens 100 may uniformly distribute the light without creating a more intensely luminous center.

Figure 2A:
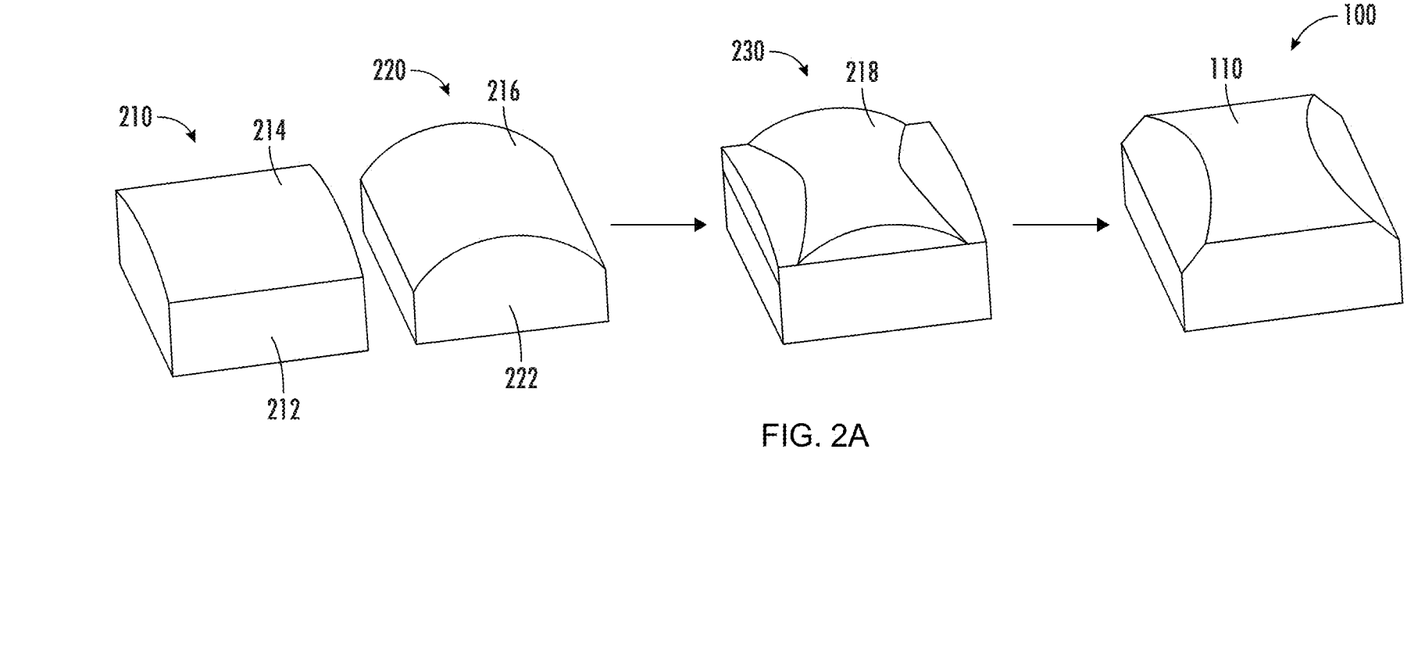
FIG. 2A is a perspective view of different phases of the light spreading lens of FIG. 1 during design and manufacture.
Figure 2B:
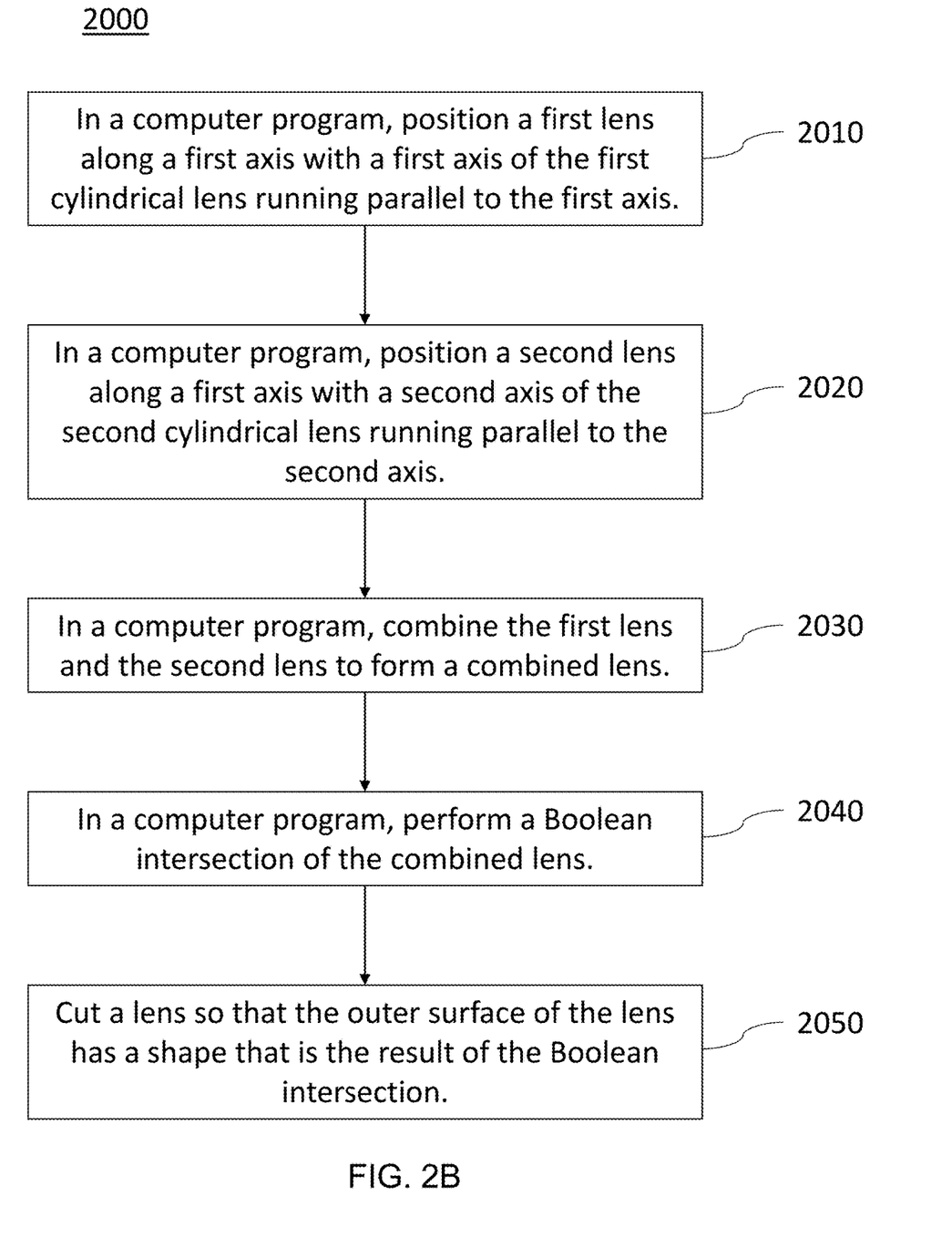
FIG. 2B is a flow chart of a method of manufacturing the light spreading lens of FIG. 1.

FIGS. 2A and 2B show a method of manufacturing a light spreading lens 100. The light spreading lens 100 may be any of the light spreading lenses described above.

FIG. 2A is a perspective view of different phases of the light spreading lens 100 of FIG. 1 during design and manufacture. FIG. 2B is a flow chart of a method 2000 of manufacturing the light spreading lens 100. As illustrated in FIGS. 2A and 2B, for example, a first lens 210 and a second lens 220 may be combined to form the shape of the light spreading lens 100 of FIG. 1. The first lens 210 and the second lens 220 may be combined in a computer program such as CAD software. Although in this example two lenses are configured to create the spreading feature 100, more than two lenses may be combined to form a light spreading lens 100. The lenses 210, 220 may be cylindrical lenses. The shape and positioning of the lenses 210, 220, however, may depend on the desired pattern of the light distribution. For example, the desired distribution pattern of the light spreading lens 100 of FIG. 1 may be cross-shaped.

As shown in FIG. 2A, the first lens 210 may be positioned along a first axis with the vertex of the cylindrical first lens 210 running parallel to the first axis (FIG. 2B, 2010). The first lens 210 may be positioned in the CAD software. The first axis may be defined as the x axis or horizontal. The first lens 210 may include a cylindrical outer surface 214. The outer surface 214 of the first lens 210 may be configured to distribute light radially outward from the first axis. As shown in FIG. 2A, the second lens 220 may be positioned along a second axis with the vertex of the cylindrical second lens 220 running parallel to the second axis (FIG. 2B, 2020). The second lens 220 may be positioned in the CAD software. The second axis may be defined as the y axis or vertical. The second lens 220 may include a cylindrical outer surface 216. The outer surface 216 of the second lens 220 may be configured to distribute light radially outward from the second axis. The first axis and the second axis may be substantially perpendicular with respect to each other. The depth of the lenses 210, 220 may extend along a third axis. The third axis may be defined as the z axis or the optical axis. The third axis may be substantially perpendicular to the first axis and the second axis.

As shown in FIG. 2A, the first lens 210 and the second lens 220 may not share a common vertex. For example, the second lens 220 may have a greater or higher vertex than the first lens 210. The first lens 210 and the second lens 220 may each have a substantially square footprint to provide uniformity and simplify production. The parameters of the first lens 210 and the second lens 220 may be used to optimize the optical function of the light spreading lens 100 through manual and algorithm-based variation. Parameters of the lenses that may be optimized may include but are not limited to the size of the lens, the thickness of the lens, the curvature of the lens, and aspheric parameters. For example, the lens lateral size may range from 1 mm to 5 mm, the lens thickness may range from 0.2 mm to 2 mm, the Y-curvature may be 0.66 and the X-curvature may be 0.71.

As shown in FIG. 2A, the first lens 210 and the second lens 220 are overlaid or superimposed to form a combined lens 230 (FIG. 2B, 2030). The first lens 210 and the second lens 220 may be overlaid in the CAD software. The first lens 210 and the second lens 220 may be defined on the same footprint. The first lens 210 and the second lens 220 may be overlaid and positioned so that a surface 212 of the first lens 210 and a corresponding surface 222 of the second lens 220 align. The combined lens 230 may include an outer surface 218 defined by the outer surface 214 of the first lens 210 and the outer surface 216 of the second lens 220. As shown in FIG. 2A, the center of the outer surface 218 of the combined lens 230 may have two layers or surfaces. The first layer may be the center of the outer surface 214 of the first lens 210 and the second layer may be the center of the outer surface 216 of the second lens 220.

As shown in FIG. 2A, the light spreading lens 100 may be formed by a Boolean intersection of the combined lens 230 (FIG. 2B, 2040). The Boolean intersection may be performed in the CAD software. The Boolean intersection may keep the portions of the combined first lens 210 and second lens 220 that are common to both the first lens 210 and second lens 220. Portions of the first lens 210 that do not overlap with the second lens 220 may be removed. Only common portions of the combined first lens 210 and second lens 220 may remain to form the light spreading lens 100. The outer surface 110 of the light spreading lens 100 may be defined by the sections of the overlapping areas of the first lens 210 and the second lens 220 of the combined lens 230. Areas of the combined lens 230 that are exclusively defined by only one of the first lens 210 or the second lens 220 may be removed. Unlike the combined lens 230, the outer surface 110 of the light spreading lens 100 may be a single layer or surface. The single layer outer surface 110 of the light spreading lens 100 may substantially uniformly distribute light exiting the outer surface 110 in a desired pattern, such as cross-shaped.

The light spreading lens 100 may be formed by cutting a lens so that the outer surface 110 has a shape that is the result of the Boolean intersection that may be produced in the CAD software (FIG. 2B, 2050). The tooling of the light spreading lens 100 may be simple because the light spreading lens 100 is composed of cylindrical surfaces. A cylindrical surface may be a linear extrusion of a profile. The light spreading lens 100 surface may consist of only cylindrical surfaces. The spreading feature 100 may be manufactured by linear tooling. In other words, the outer surface 110 of the light spreading lens 100 may be manufactured with a cutting tool with only linear movements. Linear tooling is often times faster and more precise than the 3D control cutting movements required for more complex surfaces.

Figure 3:
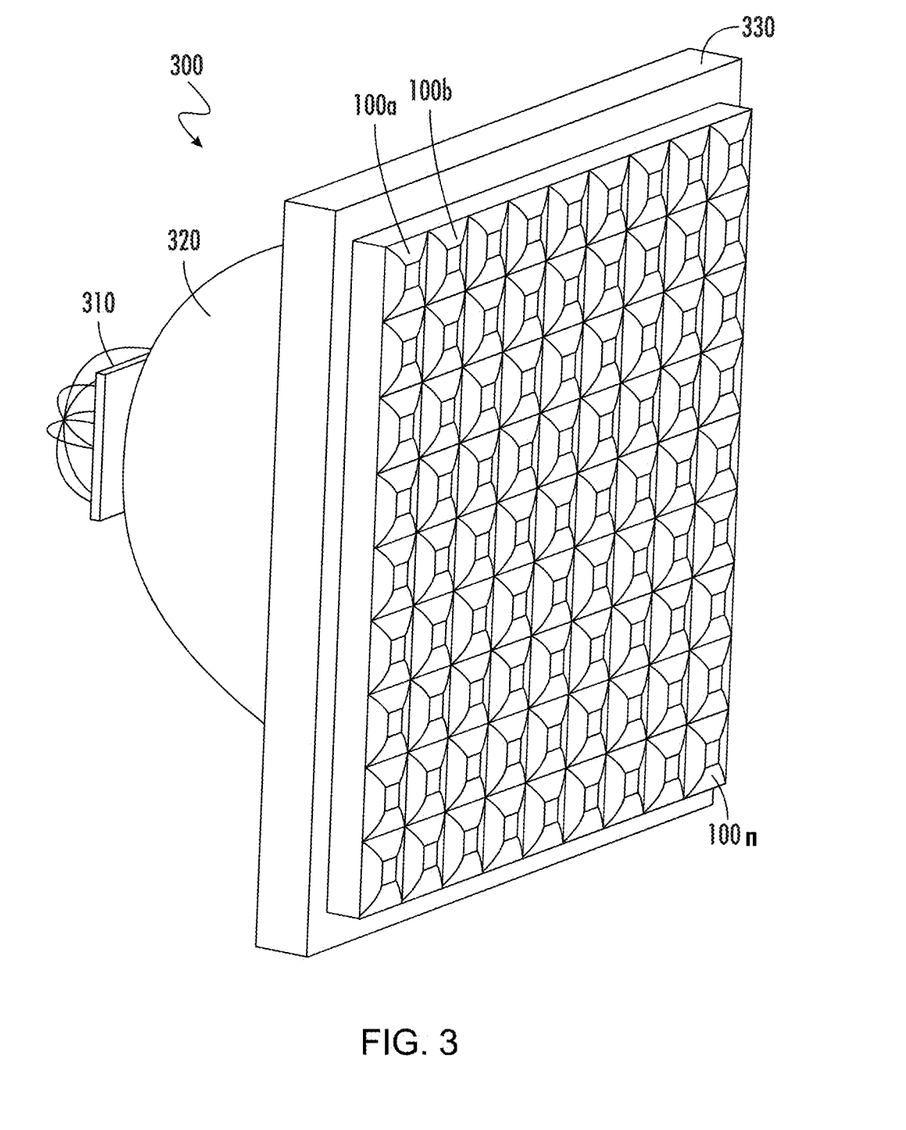
FIG. 3 is a perspective view of an optical system.

FIG. 3 is a perspective view of an optical system 300. The optical system 300 may be configured for an automotive rear fog light. The optical system 300 includes an LED 310, a collimating structure 320, and a light spreading structure 330. The LED 310 may be one or multiple LEDs, which, in some embodiments, may be an array of one or more rows and/or columns of LEDs or light-emitting segments. In some embodiments, the LEDs may be very small and closely spaced and may, therefore, be referred to as a micro-LED. Light emitted by the LED 310 may pass through the collimating structure 320 and through the light spreading structure 330. The light spreading structure 330 may uniformly distribute the light from the LED 310 in a desired pattern.

The light spreading structure 330 may include multiple light spreading lenses 100a-n. The light spreading lenses 100a-n may be adjacently coupled in rows and columns to form a grid structure. Each light spreading lens 100 of the plurality of light spreading lenses 100a-n may be any of the light spreading lenses 100 previously described. The outer surface 110 of each light spreading lens 100 of the plurality of light spreading lenses 100a-n may extend out from the exterior of the light spreading structure 330. The first axis of each light spreading lens 100 may be aligned or parallel with the first axis of a connected light spreading lens 100. The second axis of each light spreading lens 100 may be aligned or parallel with the second axis of a connected light spreading lens 100. Each light spreading lens 100 may individually distribute light in a uniform desired pattern. The plurality of light spreading lenses 100a-n together may distribute light in a uniform desired pattern. In the example embodiment shown in the figures, each light spreading lens 100 and the plurality of light spreading lenses 100a-n distributes the light in a cross-shaped pattern. Where the LED is an array of LEDs, such as a micro-LED, each of the light spreading lenses 100a-n may be located opposite one of the LEDs or light-emitting segments in the array.

Unlike light spreading structures that require multiple elements to distribute light from a luminaire in a desired shaped direction, such as a cross-shaped distribution direction, the light spreading structure 330 may be a single element that distributes light of one or several LEDs or light-emitting segments in a desired pattern. The light spreading feature 330 may eliminate the need to superimpose multiple different elements to distribute the light in a desired pattern. The light spreading feature 330 may uniformly distribute the light without creating a more intensely luminous center.

Figure 4:
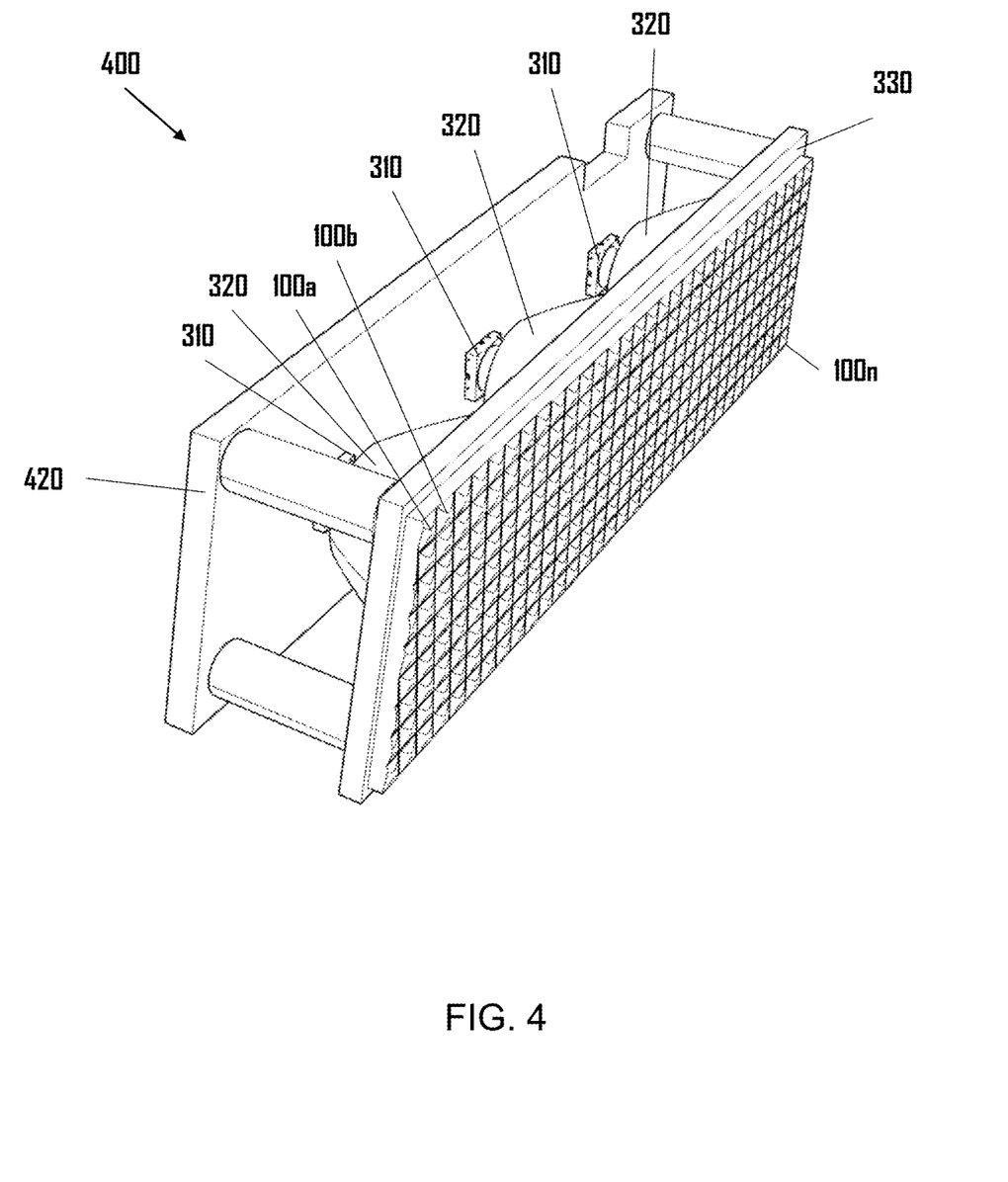
FIG. 4 is a perspective view of an automotive rear fog light module.

FIG. 4 is a perspective view of a rear fog light module 400. The illustrated rear fog light module 400 includes a circuit board 420, at least one LED or light-emitting segment 310 and a light spreading structure 330. As mentioned above, the rear fog light module 400 may include a plurality of LEDs 310. For example, the module 400 may include two or three LEDs 310. The example module 400 in FIG. 4 includes three LEDs 310. Each LED 310 may be comprised of one or multiple LEDs, which, in some embodiments, may be an array of one or more rows and/or columns of LEDs or light-emitting segments. One light collimating structure 320 may be provided opposite each LED 310. The collimating structure 320 may include several surfaces. The rear fog light module 400 may include a light spreading structure 330 including an array of light spreading lenses 100a-n. The light spreading structure 330 may form the output surface of the rear fog light module 400. The optics, including the collimating structures 320 and the light spreading structure 330, for the rear fog light module 400 may be one solid transparent unit. The rear fog light module 400 may fit and set into a corresponding cavity of the rear fog light of a vehicle. The rear fog light module 400 may be part of a rear combination lamp of a vehicle. A plurality of rear fog light modules 400 may be part of the rear combination lamp of the vehicle. The rear fog light module 400 may be configured to connect to an electrical system powered by the vehicle.

Figure 5:
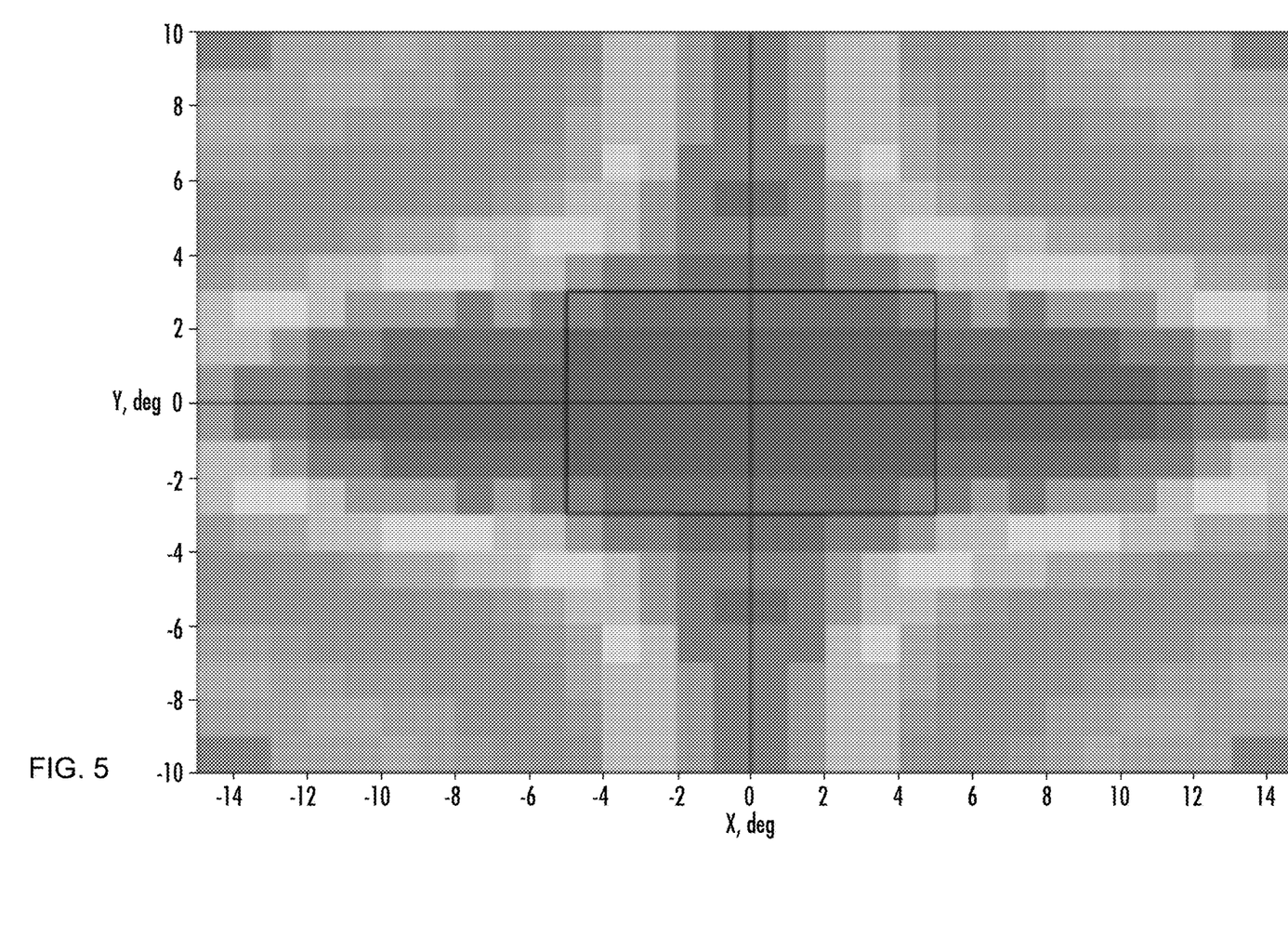
FIG. 5 is a chart of an example light distribution.
Figure 6:
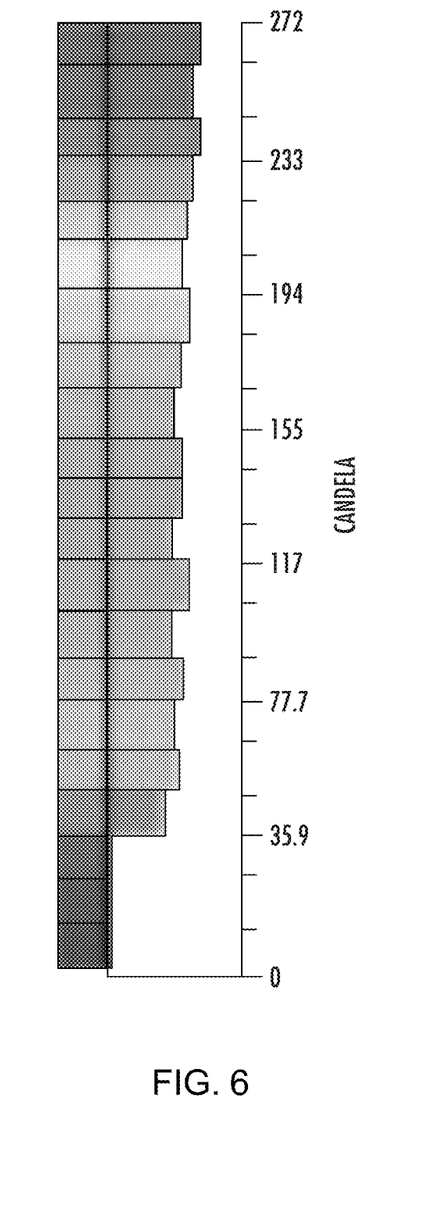
FIG. 6 is the legend for the chart in FIG. 5.
Figure 7:
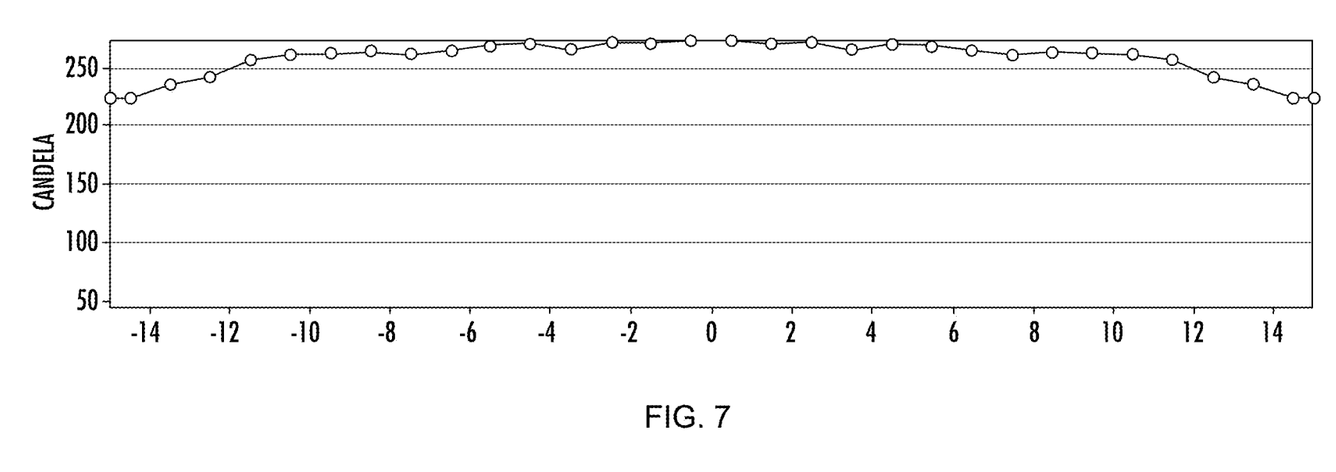
FIG. 7 is a line graph of the luminous intensity along the x axis when y is zero degrees in the chart in FIG. 5.
Figure 8:
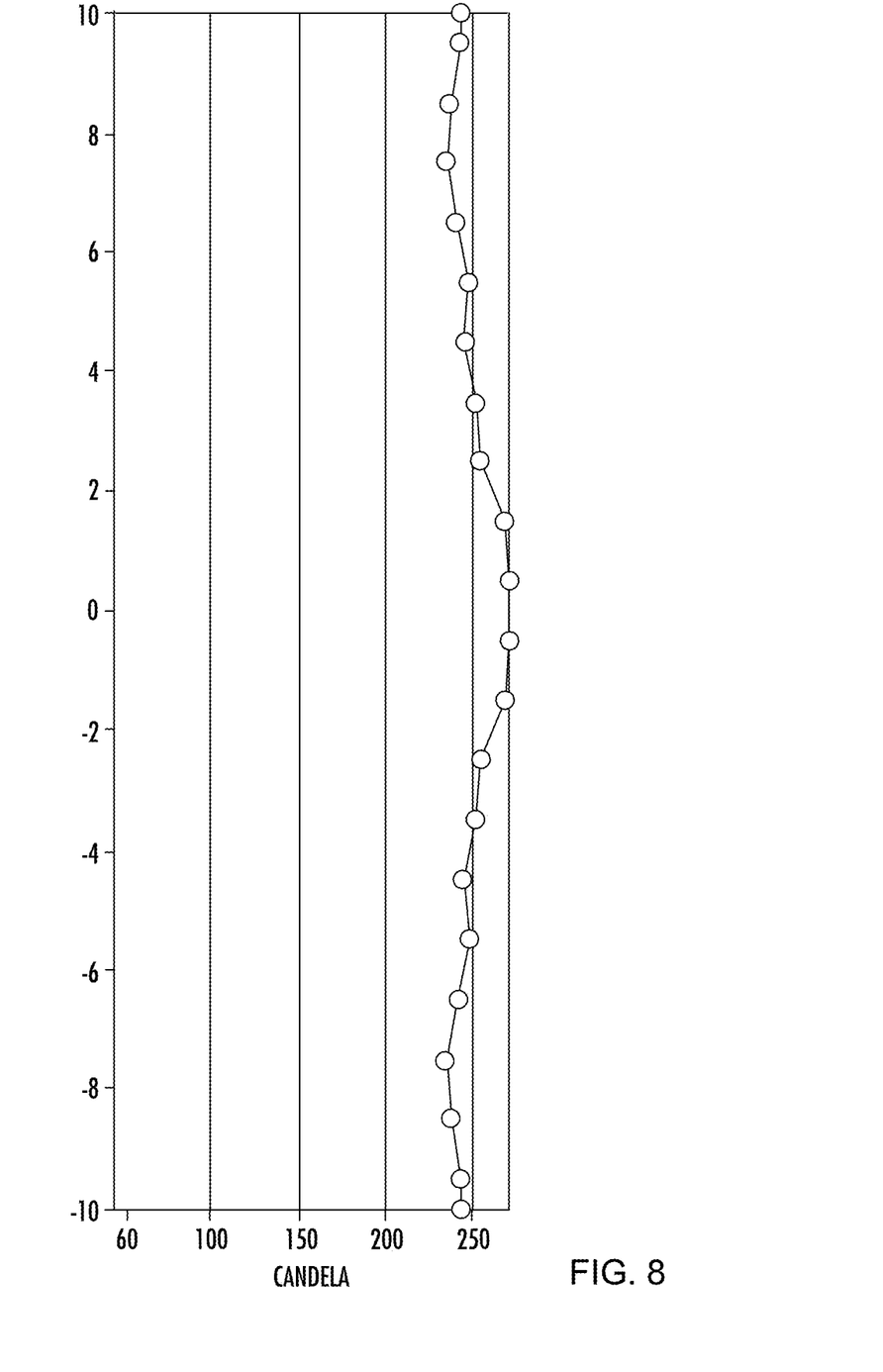
FIG. 8 is a line graph of the luminous intensity along the y axis when x is zero degrees in the chart in FIG. 5.

FIG. 5 is a chart showing an example simulated light distribution from a rear fog light module, such as the rear fog light module 400 illustrated in FIG. 4. The chart in FIG. 5 illustrates the light distribution along a first or x axis and a second or y axis of the rear fog light module 400. The chart coordinate 0, 0 or the origin may represent the approximate center of the rear fog light module 400. The grayscale shade in the chart in FIG. 5 corresponds to the chart legend shown in FIG. 6. As shown in FIG. 6, the grayscale shade indicates the luminous intensity measured in candela. As shown in the chart in FIG. 5, the light is distributed in a cross-shaped pattern. The luminous intensity along the x axis when y is zero degrees is shown in FIG. 7. The luminous intensity along the y axis when x is zero degrees is shown in FIG. 8. As shown in FIG. 7 and FIG. 8, the luminous intensity is substantially uniform.

The example light spreading structure 330 described herein may be combined with additional optical components, such as LEDs, which may be mounted in a lamp housing of an automotive rear fog light.

Figure 9:
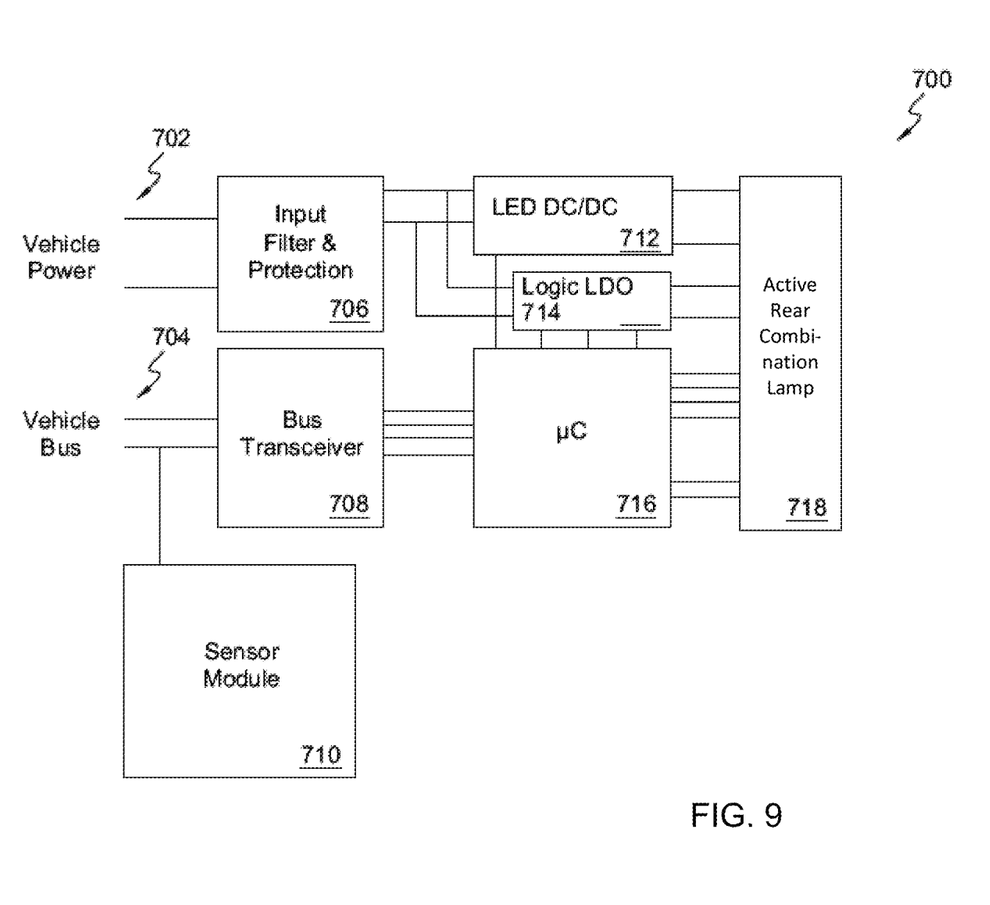
FIG. 9 is a diagram of an example rear combination lamp system.

FIG. 9 is a diagram of an example rear combination lamp system 700 that may incorporate one or more of the embodiments and examples described herein. The example rear combination lamp system 700 illustrated in FIG. 9 includes power lines 702, a data bus 704, an input filter and protection module 706, a bus transceiver 708, a sensor module 710, an LED direct current to direct current (DC/DC) module 712, a logic low-dropout (LDO) module 714, a micro-controller 716 and an active rear combination lamp 718.

The power lines 702 may have inputs that receive power from a vehicle, and the data bus 704 may have inputs/outputs over which data may be exchanged between the vehicle and the vehicle rear combination lamp system 700. For example, the rear combination lamp system 700 may receive instructions from other locations in the vehicle, such as instructions to stop, tail turn, rear fog, and back-up, and may send feedback to other locations in the vehicle if desired. The sensor module 710 may be communicatively coupled to the data bus 704 and may provide additional data to the rear combination lamp system 700 or other locations in the vehicle related to, for example, environmental conditions (e.g., time of day, rain, fog, or ambient light levels), vehicle state (e.g., parked, in-motion, speed of motion, or direction of motion), and presence/position of other objects (e.g., vehicles or pedestrians). A rear fog light controller that is separate from any vehicle controller communicatively coupled to the vehicle data bus may also be included in the rear combination lamp system 700. In FIG. 9, the rear fog light controller may be a micro-controller, such as micro-controller (μc) 716. The micro-controller 716 may be communicatively coupled to the data bus 704.

The input filter and protection module 706 may be electrically coupled to the power lines 702 and may, for example, support various filters to reduce conducted emissions and provide power immunity. Additionally, the input filter and protection module 706 may provide electrostatic discharge (ESD) protection, load-dump protection, alternator field decay protection, and/or reverse polarity protection.

The LED DC/DC module 712 may be coupled between the input filter and protection module 106 and the active rear fog light 718 to receive filtered power and provide a drive current to power LEDs in the LED array in the active rear fog light 718. The LED DC/DC module 712 may have an input voltage between 7 and 18 volts with a nominal voltage of approximately 13.2 volts and an output voltage that may be slightly higher (e.g., 0.3 volts) than a maximum voltage for the LED array (e.g., as determined by factor or local calibration and operating condition adjustments due to load, temperature or other factors).

The logic LDO module 714 may be coupled to the input filter and protection module 706 to receive the filtered power. The logic LDO module 714 may also be coupled to the micro-controller 716 and the active rear combination lamp 718 to provide power to the micro-controller 716 and/or electronics in the active rear combination lamp 718, such as CMOS logic.

The bus transceiver 708 may have, for example, a universal asynchronous receiver transmitter (UART) or serial peripheral interface (SPI) interface and may be coupled to the micro-controller 716. The micro-controller 716 may translate vehicle input based on, or including, data from the sensor module 710. The translated vehicle input may include a video signal that is transferrable to an image buffer in the active rear fog light 718. In addition, the micro-controller 716 may load default image frames and test for open/short pixels during startup. In embodiments, an SPI interface may load an image buffer in CMOS. Image frames may be full frame, differential or partial frames. Other features of micro-controller 716 may include control interface monitoring of CMOS status, including die temperature, as well as logic LDO output. In embodiments, LED DC/DC output may be dynamically controlled to minimize headroom. In addition to providing image frame data, other rear combination functions, such as complementary use in conjunction with side marker or turn signal lights, stop lights and/or activation of fog lights, may also be controlled.

Having described the embodiments in detail, those skilled in the art will appreciate that, given the present description, modifications may be made to the embodiments described herein without departing from the spirit of the disclosed concept. Therefore, it is not intended that the scope of the disclosure be limited to the specific embodiments illustrated and described, but the scope of protection is only limited by the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

What is claimed is:

1. A light spreading lens comprising:
   an outer surface defined by a Boolean intersection of a first cylindrical lens configured to distribute light along a first axis overlaid with a second cylindrical lens configured to distribute light along a second axis such that the outer surface includes surface portions including shapes of the first cylindrical lens and the second cylindrical lens, wherein the outer surface is a light exit surface of the light spreading lens.

2. The light spreading lens according to claim 1, wherein a depth of the light spreading lens runs parallel to a third axis.

3. The light spreading lens according to claim 1, wherein the first axis and the second axis are substantially perpendicular.

4. An automotive lighting system comprising:
   at least one light emitting diode (LED);
   at least one collimating structure adjacent to the at least one LED; and
   a light spreading structure adjacent to the at least one collimating structure, the light spreading structure comprising:
      a plurality of light spreading lenses mechanically coupled together, each light spreading lens of the plurality of light spreading lenses comprising:
         an outer surface defined by a Boolean intersection of a first cylindrical lens configured to distribute light along a first axis overlaid with a second cylindrical lens configured to distribute light along a second axis, wherein the outer surface of each of the plurality of light spreading lenses is a light exit surface for light emitted by the at least one LED.

5. The system according to claim 4, wherein the plurality of connected light spreading lenses is arranged in rows and columns.

6. The system according to claim 4, wherein the first axis of each light spreading lens is at least one of aligned and parallel to the first axis of a connected one of the plurality of light spreading lens.

7. The system according to claim 4, wherein the second axis of each light spreading lens is at least one of aligned and parallel to the second axis of a connected one of the plurality of light spreading lenses.

8. A method of manufacturing a light spreading lens comprising:
   cutting an outer surface of a lens material in a shape defined by a Boolean intersection of a first cylindrical lens configured to distribute light along a first axis overlaid with a second cylindrical lens configured to distribute light along a second axis such that the outer surface includes surface portions including shapes of the first cylindrical lens and the second cylindrical lens, wherein the outer surface is a light exit surface of the light spreading lens.

9. The method of claim 8 further comprising:
   generating the shape in a computer program by:
      positioning a computer-generated representation of the first cylindrical lens along the first axis with a first vertex of the first cylindrical lens running parallel along the first axis,
      positioning a computer-generated representation of the second cylindrical lens along the second axis with a second vertex of the second cylindrical lens running parallel along the second axis, combining the computer-generated representation of the first cylindrical lens and the computer-generated representation of the second cylindrical lens by overlaying the computer-generated representation of the first cylindrical lens and the computer-generated representation of the second cylindrical lens on a common footprint, and performing a Boolean intersection of the combined computer-generated representation of the first cylindrical lens and the second cylindrical lens.

\* \* \* \* \*